United States Patent
Tonius et al.

(10) Patent No.: US 9,611,898 B2
(45) Date of Patent: Apr. 4, 2017

(54) FORM-FITTING SWITCHING UNIT FOR A MOTOR VEHICLE DRIVE TRAIN

(71) Applicant: Daimler AG, Stuttgart (DE)

(72) Inventors: Nils Tonius, Weinstadt (DE); Tobias Haerter, Stuttgart (DE); Christoph Doerr, Waiblingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/439,296

(22) PCT Filed: Sep. 28, 2013

(86) PCT No.: PCT/EP2013/002926
§ 371 (c)(1),
(2) Date: Apr. 29, 2015

(87) PCT Pub. No.: WO2014/067601
PCT Pub. Date: May 8, 2014

(65) Prior Publication Data
US 2015/0300417 A1    Oct. 22, 2015

(30) Foreign Application Priority Data

Oct. 31, 2012    (DE) .................. 10 2012 021 458

(51) Int. Cl.
*F16D 11/14*    (2006.01)
*F16D 3/12*    (2006.01)

(52) U.S. Cl.
CPC ............... *F16D 11/14* (2013.01); *F16D 3/12* (2013.01); *F16D 2300/12* (2013.01)

(58) Field of Classification Search
CPC combination set(s) only.
See application file for complete search history.

(56) References Cited

U.S. PATENT DOCUMENTS

| | | | |
|---|---|---|---|
| 3,044,592 A * | 7/1962 | Noll ................. | F16D 11/10 192/41 R |
| 6,267,215 B1 | 7/2001 | Bader et al. | |
| 2008/0182693 A1* | 7/2008 | Holmes ............. | B60K 6/387 475/5 |

FOREIGN PATENT DOCUMENTS

| | | |
|---|---|---|
| AT | 173 970 B | 2/1953 |
| DE | 288235 C | 1/1912 |
| DE | 647 456 A | 7/1937 |
| DE | 883 679 C | 7/1953 |

(Continued)

OTHER PUBLICATIONS

German Search Report dated May 23, 2013 with partial English-language translation (eleven (11) pages).

(Continued)

*Primary Examiner* — Mark Manley
(74) *Attorney, Agent, or Firm* — Crowell & Moring LLP

(57) ABSTRACT

An interlocking gearshift unit for a motor vehicle drive train has a first clutch half and a second clutch half which are arranged so that they can slide relative to one another along an actuating direction in order to produce a connection with a fixed rotational relationship. At least the first clutch half has at least one first engagement element and a second engagement element, which can move with respect to the first engagement element. The first and second engagement elements are arranged so that they can move with respect to one another in a circumferential direction.

8 Claims, 6 Drawing Sheets

(56) References Cited

FOREIGN PATENT DOCUMENTS

Figure 1:
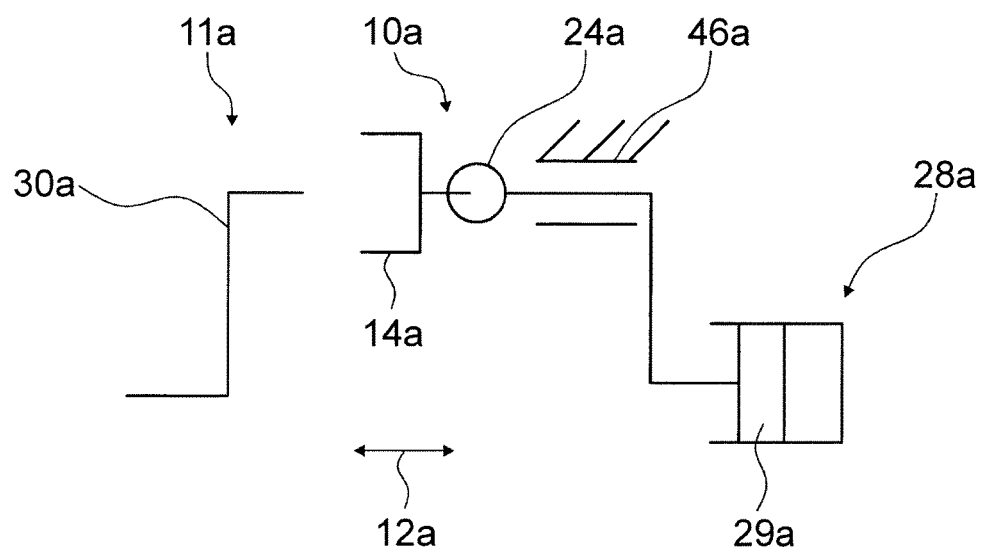

| | | |
|---|---|---|
| DE | 197 33 519 A1 | 2/1999 |
| DE | 197 02 541 B4 | 4/2005 |
| DE | 10 2010 004 956 A1 | 7/2011 |
| EP | 1 293 695 B1 | 11/2005 |
| GB | 2032542 * | 9/1979 |
| GB | 2 309 754 A | 8/1997 |
| WO | WO 2011/088856 A1 | 7/2011 |

OTHER PUBLICATIONS

International Search Report (PCT/ISA/210) dated Jan. 7, 2014 with English-language translation (four (4) pages).
German-language Written Opinion (PCT/ISA/237) dated Jan. 7, 2014 (four (4) pages).

* cited by examiner

FORM-FITTING SWITCHING UNIT FOR A MOTOR VEHICLE DRIVE TRAIN

BACKGROUND AND SUMMARY OF THE INVENTION

Exemplary embodiments of the invention relate to an interlocking gearshift unit.

German patent document DE 10 2010 004 956 A1 discloses an interlocking gearshift unit for a motor vehicle drive train having a first clutch half and a second clutch half arranged so that they can slide relative to one another along an actuating direction in order to produce a connection with a fixed rotational relationship, wherein the first clutch half has a first engagement element and a second engagement element which can move with respect to the first engagement element.

Furthermore, an interlocking gearshift unit, in which two engagement elements of a clutch half are arranged so that they can move with respect to one another in a circumferential direction, is disclosed in the book "Freilaufkupplungen—Berechnung und Konstruktion", Karl Stölzle, Sigwart Hart, Springer-Verlag, 1961, FIG. 157.

Exemplary embodiments of the invention are directed to cost-effectively increasing a shifting comfort of the interlocking gearshift unit.

Exemplary embodiments of the present invention are directed to an interlocking gearshift unit for a motor vehicle drive train having a first clutch half and a second clutch half, which are arranged so that they can slide relative to one another along an actuating direction in order to produce a connection with a fixed rotational relationship, wherein at least the first clutch half has at least one first engagement element and a second engagement element which can move with respect to the first engagement element.

Here, the engagement elements are arranged so that they can move in the circumferential direction. By this means, in a meshing operation of the interlocking gearshift unit, in which the connection with the fixed rotational relationship between the clutch halves is produced under differential speed, one of the engagement elements of the first clutch half can ease off along a circumference when it comes into contact with an engagement element of the second clutch half, thus enabling, in the case of an edge-to-edge contact or a flank contact with little overlap between teeth of the cushioning engagement element of the first clutch half and teeth of the engagement element of the second clutch half, an opposing force acting against the teeth of the engagement element of the second clutch half to be kept low. An edge is understood to mean an edge region of a tooth, in particular a chamfered edge region of a tooth. A flank is understood to mean a surface of a tooth arranged substantially parallel to the actuating direction and by means of which a torque can be transmitted following a completed meshing operation.

As, in the case of an edge-to-edge contact, only the tooth edges come into contact with one another instead of tooth flanks and, as a result, the contacting teeth only overlap to a small extent, the easing-off of one of the engagement elements and therefore the low opposing force can prevent the contact being broken once more, thus enabling the clutch halves to mesh further with one another until an overlap of the contacting teeth that is sufficient to transmit a torque is established. Because breaking of the edge-to-edge contact is prevented, grating is also avoided, thus avoiding vibrations and shocks in the meshing interlocking gearshift unit and therefore damage to the teeth. A kind of mechanical tooth gap sensor which, in a similar way to an electronic tooth gap sensor in motorsport gearboxes, allows meshing only in a region in which grating is ruled out, can be incorporated. By this means, a vibration and/or noise comfort of a shift of the interlocking gearshift unit can be increased without the use of additional electronics, thus enabling a shifting comfort of the interlocking gearshift unit to be cost-effectively increased. Further, a comfortable interlocking gearshift unit, which has low drag losses in the open running state compared with a friction gearshift unit, in particular a disc gearshift unit, can be provided, thus enabling a low-loss motor vehicle gearbox, for example, which has a high shifting comfort to be provided. An "engagement element" is understood particularly to mean an element having at least one tooth that is provided to engage in an interlocking manner in a tooth system of the engagement element of the other clutch half. A "circumferential direction" is understood particularly to mean a direction running around the actuating direction. Preferably, the actuating direction defines a direction of a longitudinal axis, around which the engagement elements are arranged so that they can rotate relative to one another. Here, the engagement elements are arranged substantially on a circular line around the bearing axis. The interlocking gearshift unit is preferably designed as a shiftable dog clutch or as a shiftable pawl brake. Preferably, the interlocking gearshift unit is used in an automatic planetary gearbox, thus enabling downshifts, in which the interlocking gearshift unit is closed, to be carried out particularly advantageously. In particular, "provided" is understood to mean specially designed, equipped and/or arranged.

Here, the first clutch half has a main body that is provided for transmitting a torque and to which the first engagement element is rigidly connected and with respect to which the second engagement element is rotatably arranged. This enables the second engagement element to be rotated about a certain angle relative to the first engagement element, as a result of which the torque transmission can be advantageously delayed or gradually reduced until a safe interlocking connection between the clutch halves is produced. Preferably, the second engagement element is arranged so that it can rotate about the bearing axis and therefore about the actuating direction relative to the first engagement element. Preferably, the main body and the first engagement element are formed in one piece with one another. In particular, "in one piece" is understood to mean molded in one piece.

According to the invention, the first engagement element has a multiplicity of blocking teeth and the second engagement element a multiplicity of fang teeth. By this means, in the meshing operation, the second clutch half first interacts with the second engagement element before interacting with the first engagement element, thus enabling the production of the connection with the fixed rotational relationship to be carried out more smoothly under differential speed. The fang teeth have the advantage that a probability of a direct meshing in the tooth gap is increased due to a large meshing tolerance. The meshing tolerance means a distance of the fang teeth from one another. Here, as a result of coming into contact with the teeth of the engagement element of the second clutch half, the fang teeth rotate until they rest against the blocking teeth or against a stop, thus enabling sufficient time to be made available to produce a reliable interlocking connection between the clutch halves. Further, it can be realized that torque is only transmitted between the clutch halves when the interlocking connection has been reliably made. A "blocking tooth" is understood to mean a tooth of the first rigid engagement element that blocks a meshing operation to a certain extent at its position. In particular, a "blocking tooth" is understood to mean a tooth of the first engagement element that forms an interlocking stop for a fang tooth for the purpose of transmitting torque and therefore preferably limits an angle about which the fang tooth can rotate relative to the blocking tooth and/or a freedom of movement of the fang tooth directed in the circumferential direction. The angle about which the fang tooth can rotate relative to the blocking tooth is preferably chosen to be sufficiently large that the meshing pawl halves are given enough time to produce an adequate overlap before the fang teeth rest against the blocking teeth and torque is transmitted. In particular, a "fang tooth" is understood to mean a tooth of the second rotatable engagement element which is provided to come into contact with the teeth of the engagement element of the second clutch half during the meshing operation before the teeth of the engagement element of the second clutch half come into contact with the blocking teeth. Preferably, a fang tooth is longer in the actuating direction than a blocking tooth. Ideally, a fang tooth is longer by an amount corresponding to the minimum overlap between a fang tooth and a tooth of the second clutch half. Particularly advantageously, the teeth on the second clutch half are exactly the same length as a fang tooth of the first clutch half.

In particular, it is advantageous when a fang tooth is arranged so that it can move in the circumferential direction between two blocking teeth. This enables a rotation of the clutch halves, which are connected with a fixed rotational relationship, to be prevented, thus enabling a so-called backlash play and therefore a knocking noise when changing load to be avoided.

Further, in order to provide an advantageous circumferential distance between two fang teeth, it is advantageous when the blocking teeth have a circumferential extension that is greater than a circumferential extension of the fang teeth. In the case of a tooth-on-tooth position, this enables reliable meshing of the teeth of the engagement element of the second clutch half in a next tooth gap after resolving the tooth-on tooth position, thus enabling a probability of meshing to be increased. In particular, a "circumferential extension" is understood to mean an extension in the circumferential direction.

Advantageously here, the fang teeth and the blocking teeth are arranged substantially on a circular line around the bearing axis. That is to say that the blocking teeth and the fang teeth are at substantially the same radial distance from the bearing axis. Particularly advantageously, teeth of the second clutch half are arranged on a circular line with substantially the same radius around the bearing axis.

Furthermore, it is advantageous when a circumferential distance between a fang tooth and a blocking tooth is substantially equal to an integral multiple of a circumferential extension of a tooth of the second clutch half, wherein the integral multiple also includes a multiple of one. This enables a backlash play in a meshed state of the two clutch halves to be prevented. A backlash play is understood to mean a gap between teeth of the first clutch half and teeth of the second clutch half in the meshed state, which leads to the two clutch halves knocking together when the direction of the load reverses.

In principle, both the blocking teeth and the fang teeth can be arranged in an axial or in a radial direction relative to the bearing axis. Likewise, the engagement element of the second clutch half can be arranged in an axial or in a radial direction.

Further, in order to save cost, it is advantageous when the blocking teeth are arranged on an inner circumference of the first engagement element and the fang teeth on a face side of the second engagement element, thus enabling the rotatable arrangement of the fang teeth and the rigid arrangement of the blocking teeth to be easily produced from a constructive point of view.

In order to arrange the engagement elements so that they can move elastically with respect to one another, in a particularly advantageous embodiment, the first clutch half has a damping unit that locates the second engagement element so that it can move elastically relative to the first engagement element in at least one circumferential direction. This enables a pre-defined starting position of the second engagement element relative to the first engagement element to be automatically established and maintained after releasing the connection with a fixed rotational relationship between the clutch halves. Further, this also enables an impact pulse on producing the connection with a fixed rotational relationship under differential speed to be damped, thus enabling shifting of the interlocking gearshift unit to be made particularly quiet. Further, the opposing force exerted by the second engagement element of the first clutch half on the engagement element of the second clutch half is limited, as a result of which the meshing together of the clutch halves is facilitated, as a frictional force between the two flanks which opposes a meshing movement is limited by the elastic mounting. Preferably, the damping unit locates the second engagement element elastically in both circumferential directions relative to the first engagement element, thus enabling grating to be reliably avoided when meshing under differential speed in combination with a direction reversal. Preferably, the damping unit has at least one elastic element that is repeatedly deformable without the element becoming mechanically damaged or destroyed thereby, and which automatically tries to return to the starting position, in particular after a deformation.

Further, the damping unit can have at least one spring, thus enabling, particularly advantageously, the second engagement element to be supported so that it can move elastically. The spring is preferably in the form of a helical spring. Basically, the damping unit can alternatively have a rubber element or similar as the elastic element. In a particularly advantageous manner, the elastic element or spring has a non-linear progressive spring characteristic.

In order to guarantee a reliable and rapid engagement of the interlocking gearshift unit, it is particularly advantageous when the engagement elements are additionally arranged so that they can slide elastically relative to one another along the actuating direction. As a result, in the case of the tooth-on-tooth position, one of the engagement elements can ease off elastically in an axial direction and buffer a meshing force which, when the tooth-on-tooth position is resolved, can then be used for complete meshing and therefore for terminating the meshing operation.

In addition, it is advantageous when the second clutch half has a main body that is provided for transmitting torque and at least one engagement element arranged so that it can slide elastically with respect to the main body along the actuating direction and which is connected to the main body with a fixed rotational relationship, thus enabling the engagement of the interlocking gearshift unit to be further improved in the case of the tooth-on-tooth position.

Further advantages can be seen from the following description of the figures. Four exemplary embodiments of the invention are shown in the figures. The figures, the description of the figures and the claims contain numerous characteristics in combination. Expediently, the person skilled in the art will also consider the features singly and combine them to form meaningful further combinations.

BRIEF DESCRIPTION OF THE DRAWING FIGURES

Figure 2:
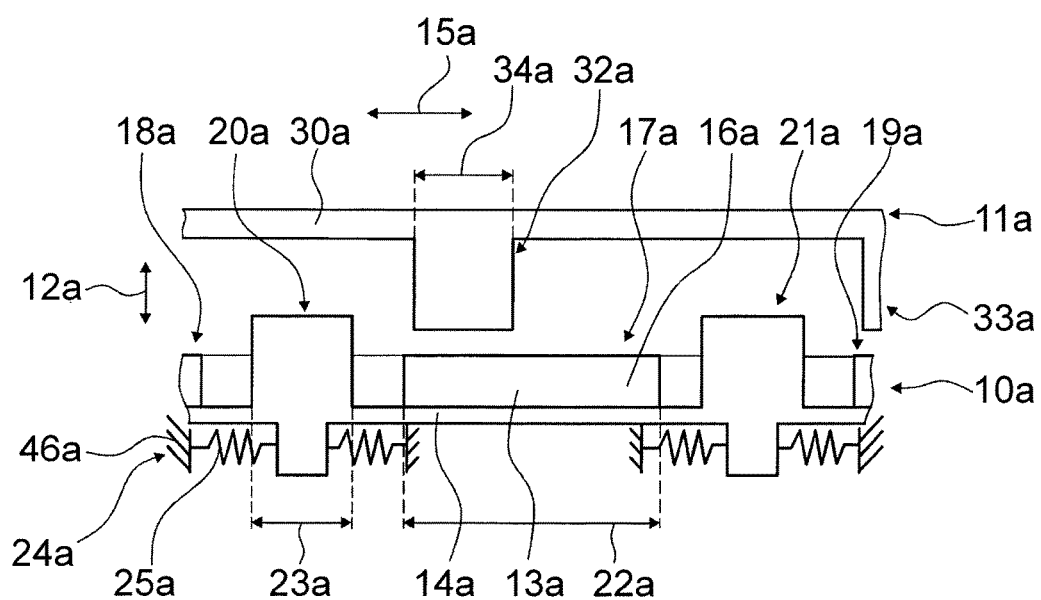
Figure 3:
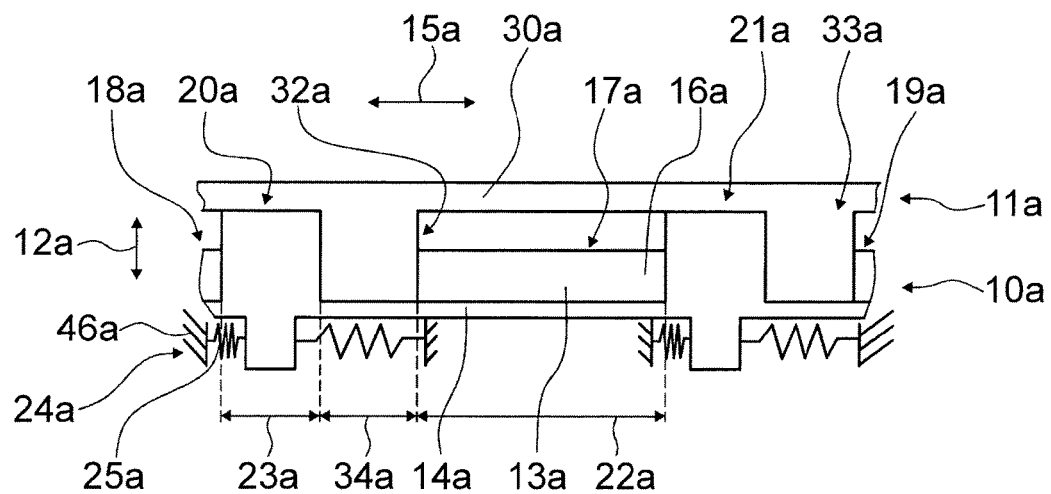
Figure 4:
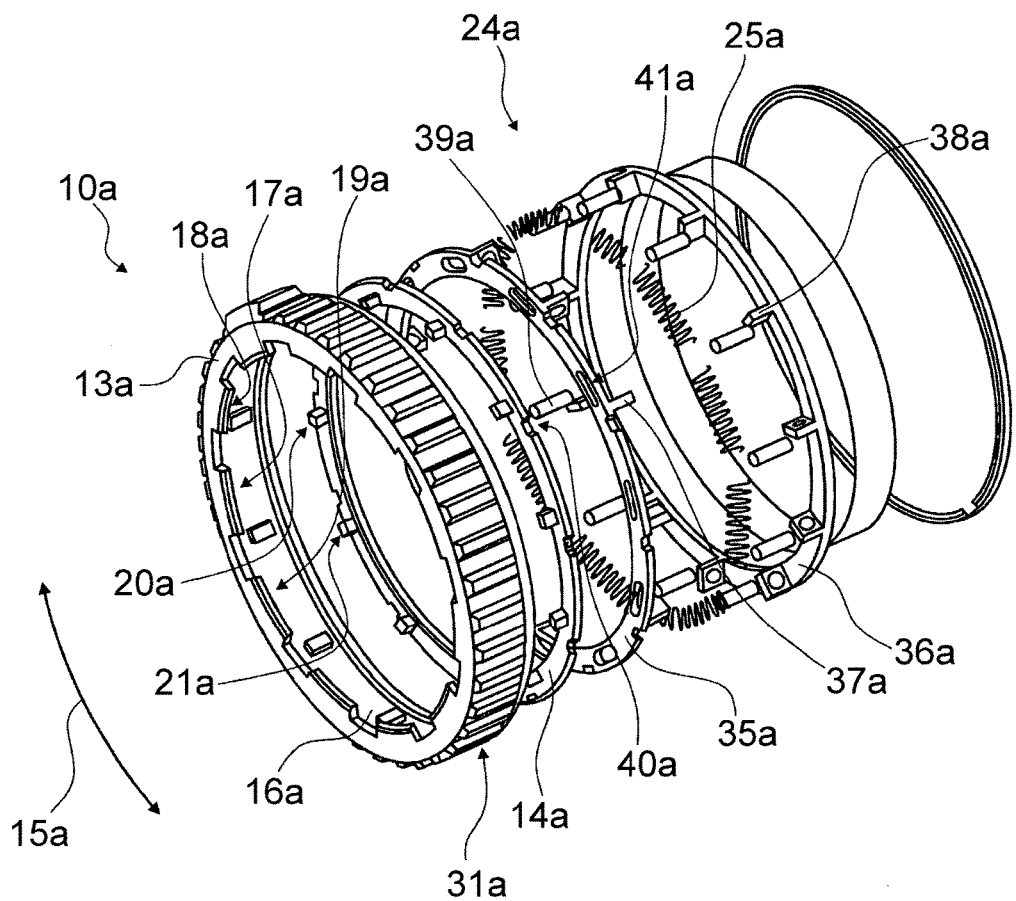
Figure 5:
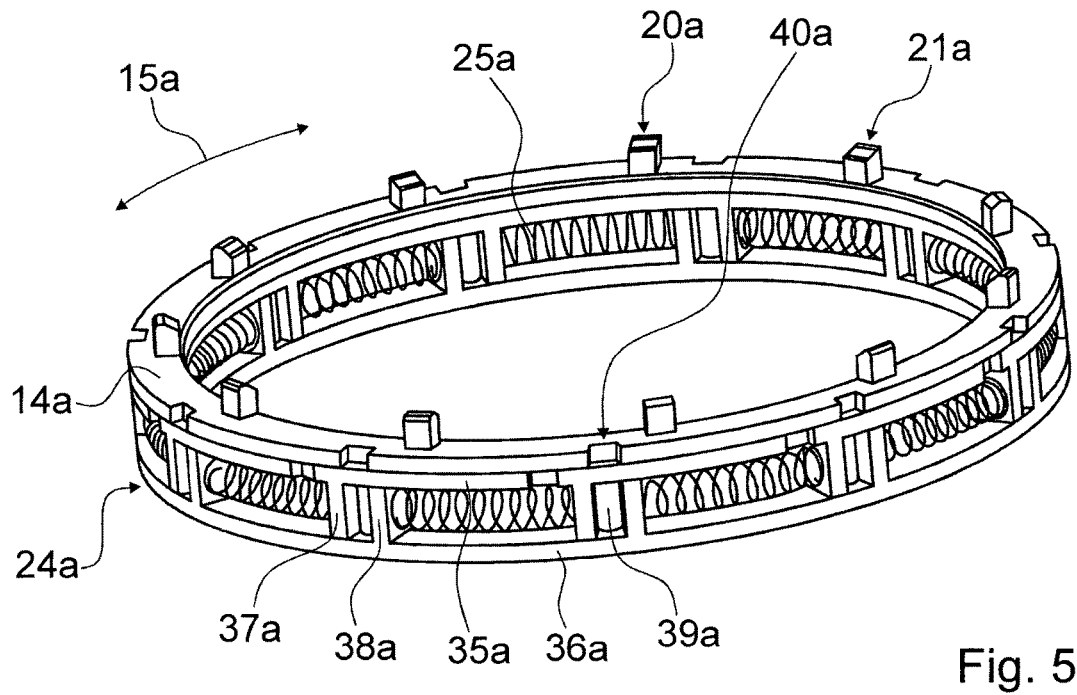
Figure 6:
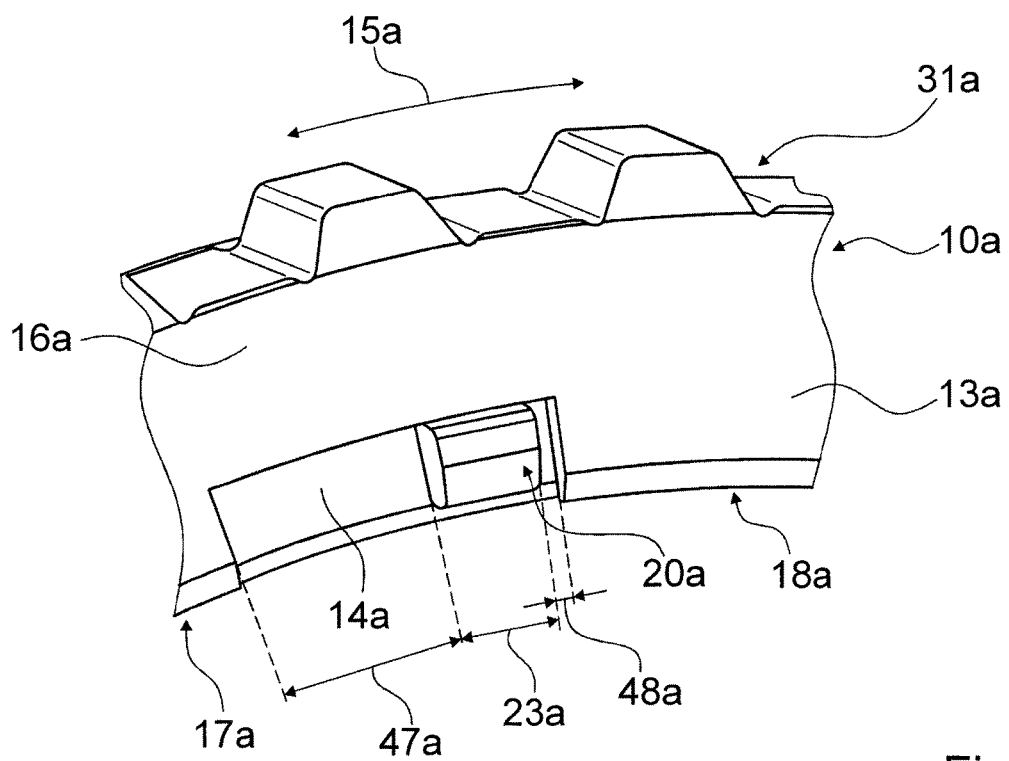
Figure 7:
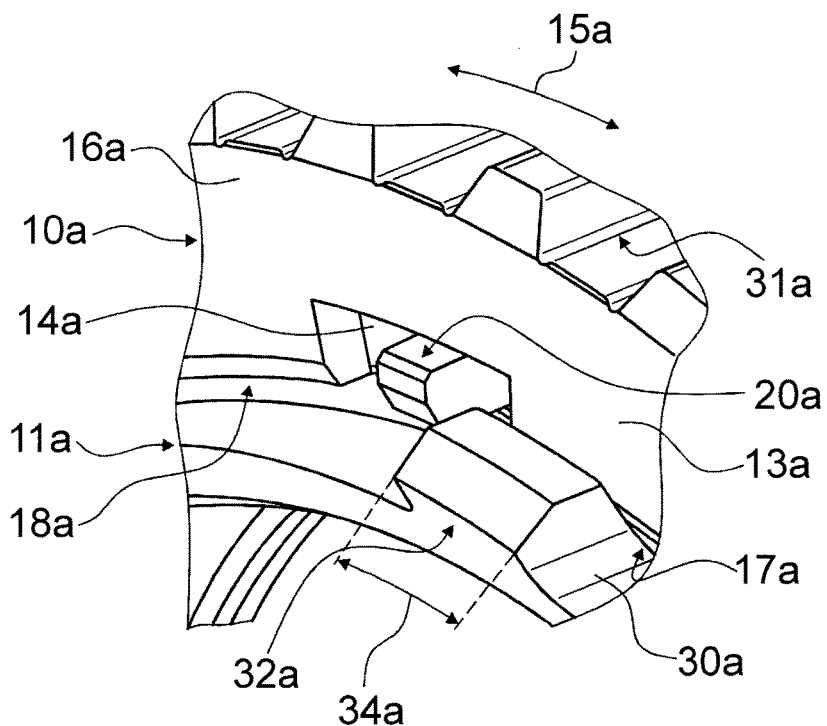
Figure 8:
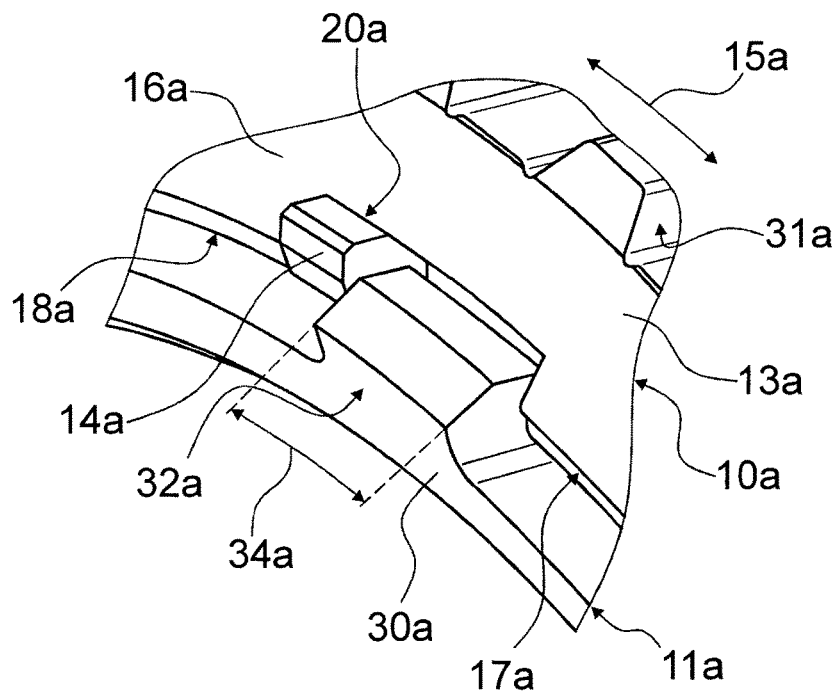
Figure 9:
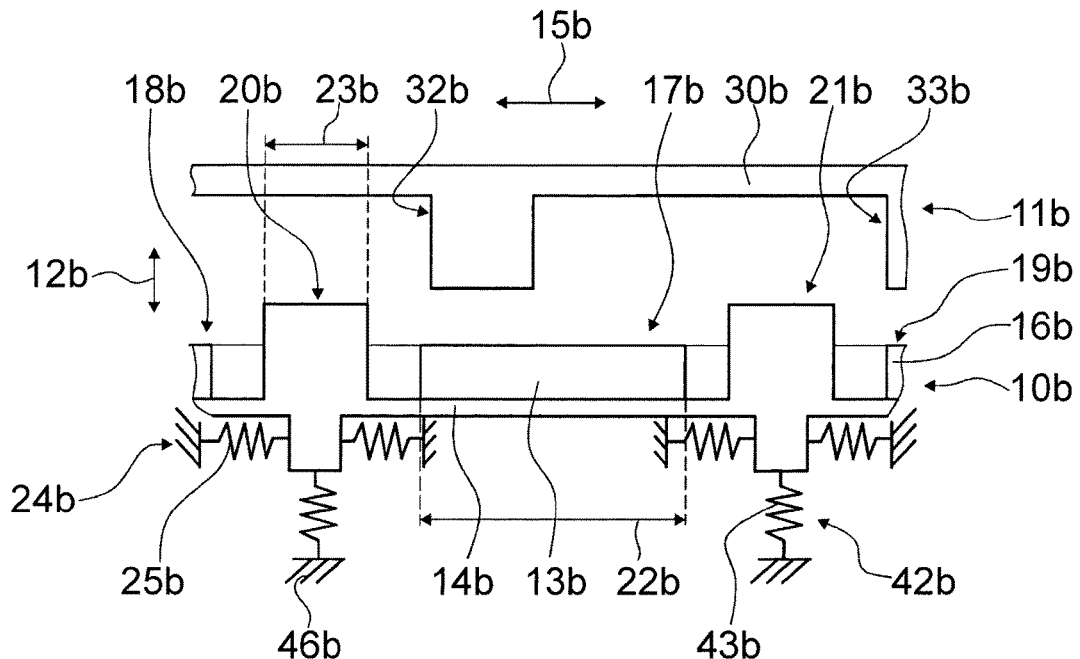
Figure 10:
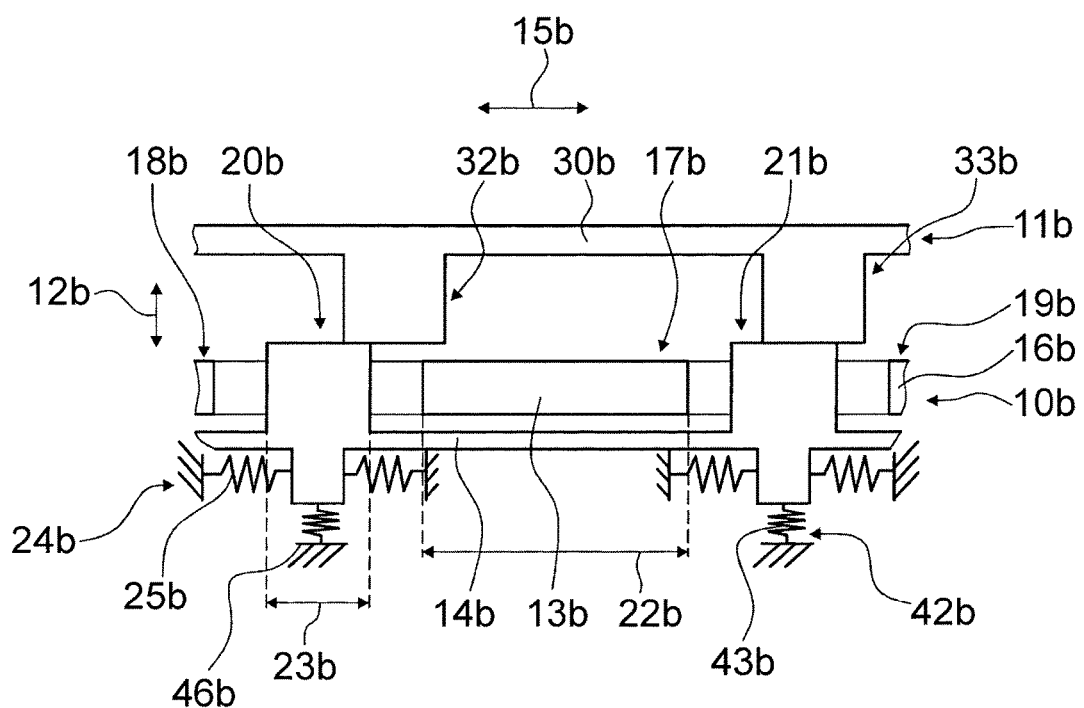
Figure 11:
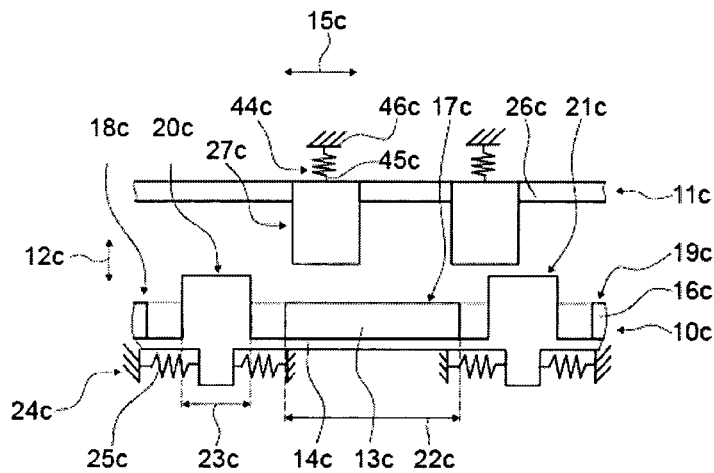
Figure 12:
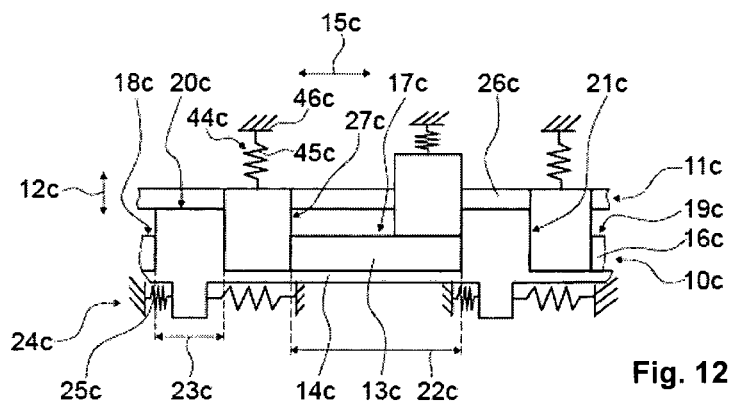
Figure 13A:
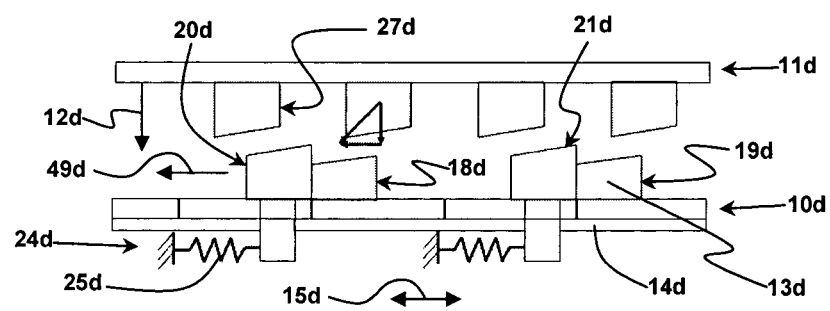
Figure 13B:
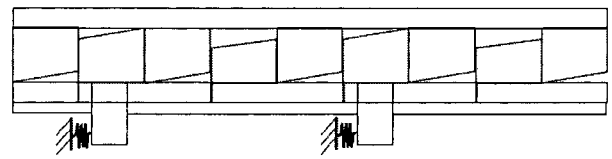

In the drawing:

FIG. 1 shows a schematic diagram of a shiftable interlocking gearshift unit of a motor vehicle drive train having a first clutch half and a second clutch half, and an actuating unit for actuating the interlocking gearshift unit, FIG. 2 shows, schematically, the interlocking gearshift unit in an open state, FIG. 3 shows, schematically, the interlocking gearshift unit in a closed state, FIG. 4 shows an exploded diagram of the first clutch half, FIG. 5 shows a second engagement element and a damping unit of the first clutch half, FIG. 6 shows a section of the first clutch half in an assembled state shown perspectively, FIG. 7 shows an engagement element of the second clutch half which is in contact with the second engagement element of the first clutch half in a meshing operation, FIG. 8 shows a meshed state of the pawl halves, FIG. 9 shows, schematically, an alternatively designed interlocking gearshift unit in an open state, FIG. 10 shows, schematically, the alternatively designed interlocking gearshift unit in a closed state, FIG. 11 shows a third exemplary embodiment of an interlocking gearshift unit in an open state shown schematically, FIG. 12 shows the interlocking gearshift unit from FIG. 11 in a closed state shown schematically, and FIG. 13 shows, schematically, a further alternatively designed interlocking gearshift unit in an open state (FIG. 13a) and a closed state (FIG. 13b).

DETAILED DESCRIPTION

FIGS. 1 to 8 show an interlocking gearshift unit of a motor vehicle drive train used in a motor vehicle gearbox which is not shown in more detail. Here, the motor vehicle gearbox is in the form of a stepped automatic gearbox with a planetary gearbox design.

The interlocking gearshift unit has a first clutch half 10a and a second clutch half 11a arranged so that they can be slid relative to one another along an actuating direction 12a in order to produce a connection with a fixed rotational relationship. For shifting and therefore to produce the connection with the fixed rotational relationship, the first clutch half 10a can be actively moved in the actuating direction 12a. For this purpose, the motor vehicle gearbox has an actuating unit 28a, which has an actuating piston 29a connected to the first clutch half 10a, in order to shift the interlocking gearshift unit. Here, the actuating unit 28a is hydraulic, but can basically also be pneumatic. Electromechanical actuation is also possible, e.g., by means of a shifting roller and an adjustment motor.

For the purpose of forming a connection with a fixed rotational relationship, the first clutch half 10a has two engagement elements 13a, 14a and the second clutch half 11a an engagement element 30a, wherein the two engagement elements 13a, 14a of the first clutch half 10a can be connected in an interlocking manner to the engagement element 30a of the second clutch half 11a to produce the connection with a fixed rotational relationship.

Engagement elements 13a, 14a of the first clutch half 10a are arranged so that they can move with respect to one another in the circumferential direction 15a in order to incorporate a mechanical tooth gap sensor function. The engagement elements 13a, 14a can be rotated about the actuating direction 12a in opposite directions. They are mounted so that they can move with respect to one another in the circumferential direction 15a. Here, the actuating direction 12a defines a bearing axis about which the engagement elements 13a, 14a can be rotated in opposite directions.

In order to transmit a torque, the first clutch half 10a has a main body 16a which, in this exemplary embodiment, is connected with a fixed rotational relationship to a gearbox housing 46a. The main body 16a has external gearing 31a for the actuating piston 29a. The actuating piston 29a is connected with a fixed rotational relationship to the main body 16a by means of the external gearing 31a. In order to shift the interlocking gearshift unit, the actuating piston 29a is connected to the main body 16a. Basically, the main body 16a can also be connected with a fixed rotational relationship to a gearbox shaft.

The first engagement element 13a is connected in one piece and therefore rigidly to the main body 16a. The main body 16a forms the first engagement element 13a. The actuating piston 29a is therefore connected to the first engagement element 13a with a fixed rotational relationship. The second engagement element 14a is arranged so that it can be rotated about a certain angle with respect to the main body 16a. It is rotatably mounted relative to the first engagement element 13a. The second engagement element 14a is therefore mounted so that it can be rotated about the angle with respect to the gearbox housing 46a. At the same time, the second engagement element 14a is connected to the main body 16a and therefore to the first engagement element 13a with a fixed sliding relationship. The first engagement element 13a, which is rigidly connected to the main body 16a, is referred to below as the rigid engagement element 13a, and the second engagement element 14a, which is rotatably arranged with respect to the main body 16a, is referred to below as the rotatable engagement element 14a.

The rigid engagement element 13a has a multiplicity of blocking teeth 17a, 18a, 19a arranged spaced apart from one another along the circumferential direction 15a. The rigid engagement element 13a is in the form of a rigid pawl ring, on which the blocking teeth 17a, 18a, 19a are permanently arranged uniformly distributed around its circumference. The rigid engagement element 13a is made in one piece. The blocking teeth 17a, 18a, 19a each have a circumferential space between them. At the same time, the blocking teeth 17a, 18a, 19a are arranged on an internal circumference of the rigid engagement element 13a. They extend radially to a midpoint of the rigid engagement element 13a.

The rotatable engagement element 14a has a multiplicity of fang teeth 20a, 21a which are arranged spaced apart from one another along the circumferential direction 15a. The rotatable engagement element 14a is in the form of a rotatable pawl ring, on which the fang teeth 20a, 21a are permanently arranged uniformly distributed around its circumference. The rotatable engagement element 14a is made in one piece. The fang teeth 20a, 21a each have a circumferential space between them. At the same time, the fang teeth 20a, 21a are arranged on a face side of the rotatable engagement element 14a. They extend axially along the actuating direction 12a in the direction of the second clutch half 11a. Basically, the rotatable engagement element 14a can also be made in several parts. In doing so, the engagement element 14a can, for example, be divided into a plurality of partial rings. Further, it is basically conceivable for the fang teeth 20a, 21a to be formed separately, wherein they are permanently arranged on a carrier, for example clipped onto the carrier and/or brazed to the carrier, wherein the carrier with the fang teeth 20a, 21a form the rotatable engagement element.

In each case, a fang tooth 20a, 21a engages between two blocking teeth 17a, 18a, 19a and is therefore in each case arranged between two blocking teeth 17a, 18a, 19a so that it can move in the circumferential direction 15a. In this way, the blocking teeth 17a, 18a, 19a form an interlocking stop for the fang teeth 20a, 21a. The blocking teeth 17a, 18a, 19a limit the movement of the fang teeth 20a, 21a in the circumferential direction 15a. The circumferential distance between the blocking teeth 17a, 18a, 19a defines the angle about which the rotatable engagement element 14a can be rotated relative to the rigid engagement element 13a. The blocking teeth 17a, 18a, 19a and the fang teeth 20a, 21a in each case have a circumferential extension 22a, 23a, wherein the circumferential extension 22a of the blocking teeth 17a, 18a, 19a is greater than the circumferential extension 23a of the fang teeth 20a, 21a. At the same time, the fang teeth 20a, 21a overlap the blocking teeth 17a, 18a, 19a axially and therefore in the actuating direction 12a in the direction of the second clutch half 11a, thus enabling a probability of meshing to be increased. However, an embodiment, which is not shown, in which the circumferential extension of the fang teeth and the blocking teeth is the same, is also possible.

The engagement element 30a of the second clutch half 11a has a multiplicity of teeth 32a, 33a which are arranged spaced apart from one another along the circumferential direction 15a. Here, a number of the teeth 32a, 33a of the engagement element 30a of the second clutch half 11a corresponds to a number of the fang teeth 20a, 21a of the second engagement element 14a of the first clutch half 10a. The teeth 32a, 33a are arranged uniformly distributed around the circumference of the engagement element 30a. They are arranged on a face side of the engagement element 30a. The teeth 32a, 33a extend axially along the actuating direction 12a in the direction of the first clutch half 10a.

The teeth 32a, 33a of the engagement element 30a of the second clutch half 11a in each case have a circumferential extension 34a, by means of which the teeth 32a, 33a in each case fit between the blocking teeth 17a, 18a, 19a when the fang teeth 20a, 21a rest against a blocking tooth 17a, 18a, 19a in an interlocking manner (cf. FIG. 3). Here, a sum of the circumferential extension 23a of a fang tooth 20a, 21a of the second engagement element 30a of the first clutch half 10a and the circumferential extension 34a of a tooth 32a, 33a of the engagement element 30a of the second clutch half 11a is almost equal to the circumferential distance between the blocking teeth 17a, 18a, 19a. As a result, a fang tooth 20a, 21a of the first clutch half 10a and a tooth 32a, 33a of the second clutch half 11a together almost completely fill the circumferential distance between the blocking teeth 17a, 18a, 19a of the first clutch half 10a, as a result of which knocking is avoided during a change of direction.

A geometry of the blocking teeth 17a, 18a, 19a, the fang teeth 20a, 21a and the teeth 32a, 33a can be designed with or without deflecting chamfers. Here, a tooth tip of the blocking teeth 17a, 18a, 19a, the fang teeth 20a, 21a and the teeth 32a, 33a can basically be formed in different ways, for example formed pointed, chamfered on one side, rounded or flat.

Further, the first clutch half 10a has a damping unit 24a that locates the rotatable engagement element 14a so that it can move elastically relative to the rigid engagement element 13a in both circumferential directions 15a. The damping unit 24a elastically supports the rotatable engagement element 14a in the circumferential direction 15a with respect to the gearbox housing 46a. For this purpose, the damping unit 24a has a multiplicity of springs 25a uniformly distributed along a circumference of the first clutch half 10a. Here, the springs 25a damp the rotation of the rotatable engagement element 14a in both circumferential directions 15a. The damping unit 24a locates the rotatable engagement element 14a resiliently in both circumferential directions 15a. In an open state of the interlocking gearshift unit, it automatically sets up a defined starting position of the rotatable engagement element 14a relative to the rigid engagement element 13a and maintains this in the open state. The springs 25a are in each case in the form of a helical spring. The starting position of the rotatable engagement element 14a relative to the rigid engagement element 13a and therefore a starting position of a fang tooth 20a, 21a relative to its neighboring blocking teeth 17a, 18a, 19a is shown in FIG. 6.

The damping unit 24a has a first annular supporting element 35a and a second annular supporting element 36a. The first supporting element 35a has supporting walls 37a distributed around its circumference and the second supporting element 36a has supporting walls 38a distributed around its circumference. In each case, a spring 25a of the damping unit 24a is supported in the circumferential direction 15a against a supporting wall 37a of the first supporting element 35a and against a supporting wall 38a of the second supporting element 36a. A spring 25a is therefore in each case connected by one end to a supporting wall 37a of the first supporting element 35a and by another end to the supporting wall 38a of the second supporting element 36a. In doing so, the springs 25a are pre-tensioned. The supporting element 35a, 36a can therefore be rotated elastically or resiliently in opposite directions.

In order to connect the rotatable engagement element 14a to the supporting elements 35a, 36a, the damping unit 24a has a multiplicity of bolts 39a, which are in each case arranged between a supporting wall 37a of the first supporting element 35a and a supporting wall 38a of the second supporting element 36a. At the same time, the rotatable engagement element 14a has a multiplicity of slots 40a and the first supporting element 35a has a multiplicity of elongated holes 41a. In each case, a bolt 39a engages in a slot 40a of the rotatable engagement element 14a in an interlocking manner and, in doing so, in each case passes through an elongated hole 41a of the first supporting element 35a.

In a meshing operation, in which, starting from an open state, the interlocking gearshift unit is actuated into a closed state by means of the actuating unit 28a, the first clutch half 10a moves along the actuating direction 12a in the direction of the second clutch half 11a. In doing so, the fang teeth 20a, 21a of the rotatable engagement element 14a of the first clutch half 10a and the teeth 32a, 33a of the engagement element 30a of the second clutch half 11a (cf. FIG. 7) come into contact with one another, as a result of which the fang teeth 20a, 21a ease off in the circumferential direction 15a due to a differential speed between the clutch halves 10a, 11a. As a result, the fang teeth 20a, 21a rotate with respect to the blocking teeth 17a, 18a, 19a, as a result of which the springs 25a are compressed. The fang teeth 20a, 21a therefore ease off along the circumference. In doing so, the fang teeth 20a, 21a rotate until they rest against a blocking tooth 17a, 18a, 19a in an interlocking manner (cf. FIG. 8). As a result of a further movement of the first clutch half 10a along the actuating direction 12a in the direction of the second clutch half 11a, the teeth 32a, 33a of the engagement element 30a of the second clutch half 11a engage in an interlocking manner in the circumferential spacing between the blocking teeth 17a, 18a, 19a, thus enabling a torque to be transmitted between the clutch halves 10a, 11a via the fang teeth 20a, 21a.

In an un-meshing operation, in which, starting from the closed state, the interlocking gearshift unit is actuated into the open state by means of the actuating unit 28a, the first clutch half 10a moves away from the second clutch half 11a along the actuating direction 12a, as a result of which the interlocking connection is released. In doing so, the springs 25a relax and as a result automatically move the fang teeth 20a, 21a into the starting position.

Two further exemplary embodiments of the invention are shown in FIGS. 9 to 12. The following descriptions are substantially restricted to the differences between the exemplary embodiments, wherein, basically, reference can also be made to the figures and/or the description of the other exemplary embodiments, in particular FIGS. 1 to 8, with regard to identically referenced components, in particular with regard to components with the same reference numbers. To differentiate between the exemplary embodiments, the letter a in the references for the exemplary embodiment of FIGS. 1 to 8 is replaced by the letter b in the references for the exemplary embodiment of FIGS. 9 and 10 and by the letter c in the references for the exemplary embodiment of FIGS. 11 and 12.

A second exemplary embodiment of an interlocking gearshift unit for a motor vehicle drive train having a first clutch half 10b and a second clutch half 11b arranged so that they can slide relative to one another along an actuating direction 12b in order to produce a connection with a fixed rotational relationship is shown in FIGS. 9 and 10. Here, the first clutch half 10b has a first engagement element 13b and a second engagement element 14b which can move with respect to the first engagement element 13b, wherein the engagement elements 13b, 14b are arranged so that they can move with respect to one another in the circumferential direction 15b. For a resilient arrangement of the second engagement element 14b, the first clutch half 10b has a damping unit 24b comprising a multiplicity of springs 25b. The first engagement element 13b is rigidly connected to a main body 16b and has blocking teeth 17b, 18b, 19b. The second engagement element 14b is arranged so that it can rotate with respect to the main body 16b and has fang teeth 20b, 21b. At the same time, the blocking teeth 17b, 18b, 19b have a circumferential extension 22b which is greater than a circumferential extension 23b of the fang teeth 20b, 21b.

In contrast to the previous exemplary embodiment, the engagement elements 13b, 14b are additionally arranged so that they can slide elastically relative to one another along the actuating direction 12b. The second rotatable engagement element 14b is additionally arranged so that it can slide relative to the first rigid engagement element 13b along the actuating direction 12b and therefore axially. The first clutch half 10b has a second damping unit 42b, which locates the second engagement element 14b so that it can move elastically relative to the first engagement element 13b in the actuating direction 12b. The damping unit 42b supports the second rotatable engagement element 14b elastically with respect to a gearbox housing 46b in the actuating direction 12b. For this purpose, the damping unit 42b has a multiplicity of springs 43b uniformly distributed along a circumference of the first clutch half 10b. In doing so, the springs 43b damp the axial movement of the second rotatable engagement element 14b. The springs 43b are in each case arranged so that they act between a fang tooth 20b, 21b and the gearbox housing 46b. A spring 43b is in each case connected by one end to a fang tooth 20b, 21b and by another end to the gearbox housing 46b. The second rotatable engagement element 14b is therefore arranged with respect to the first rigid engagement element 13b in an axially resilient manner. The damping unit 42b automatically sets up and maintains a defined axial starting position of the second rotatable engagement element 14b relative to the first rigid engagement element 13b. The springs 43b are in each case in the form of a helical spring.

In this exemplary embodiment, the second engagement element 14b as a whole and therefore with the fang teeth 20b, 21b can be slid relative to the first engagement element 13b along the actuating direction 12b. Basically, however, it is also conceivable that only the fang teeth 20b, 21b of the second engagement element 14b are arranged so that they can slide relative to the first engagement element 13b along the actuating direction 12b. Here, the second engagement element 14b consists of a carrier and the fang teeth 20b, 21b, wherein the carrier is fixed relative to the first engagement element 13b in the actuating direction 12b and the fang teeth 20b, 21b are arranged so that they can slide relative to the carrier in the actuating direction 12b. At the same time, the fang teeth 20b, 21b are permanently connected to the carrier in the circumferential direction 15b.

In a meshing operation, in which a tooth-on-tooth position is present, the second engagement element 14b eases off in the actuating direction 12b and therefore axially, as a result of which the springs 43b of the damping unit 42b store an actuating force. In doing so, a spring force of the springs 43b acts axially against an engagement element 30b of the second clutch half 11b. As soon as the tooth-on-tooth position is resolved, the second engagement element 14b automatically moves in the direction of the second clutch half 11b, as a result of which the fang teeth 20b, 21b snap between teeth 32b, 33b of the engagement element 30b of the second clutch half 11b and terminate the meshing operation.

FIGS. 11 and 12 illustrate a third exemplary embodiment of an interlocking gearshift unit for a motor vehicle drive train having a first clutch half 10c and a second clutch half 11c, which are arranged so that they can slide relative to one another along an actuating direction 12c in order to produce a connection with a fixed rotational relationship. Here, the first clutch half 10c has a first engagement element 13c and a second engagement element 14c that can move with respect to the first engagement element 13c, wherein the engagement elements 13c, 14c are arranged so that they can move with respect to one another in the circumferential direction 15c. For a resilient arrangement of the second engagement element 14c, the first clutch half 10c has a damping unit 24c comprising a multiplicity of springs 25c. The first engagement element 13c is rigidly connected to a main body 16c and has blocking teeth 17c, 18c, 19c. The second engagement element 14c is arranged so that it can rotate with respect to the main body 16c and has fang teeth 20c, 21c. At the same time, the blocking teeth 17c, 18c, 19c have a circumferential extension 22c that is greater than a circumferential extension 23c of the fang teeth 20c, 21c.

In contrast to the previous exemplary embodiments, the second clutch half 11c has a main body 26c provided for transmitting torque and a multiplicity of engagement elements 27c in the form of teeth that are arranged so that they can slide elastically with respect to the main body 26c along the actuating direction 12c and are in each case connected to the main body 26c with a fixed rotational relationship. The engagement elements 27c can therefore be slid axially with respect to the main body 26c of the second clutch half 11c. The second clutch half 11c has a damping unit 44c, which locates the engagement element 27c so that it can move elastically relative to the main body 26c in the actuating direction 12c. The damping unit 44c supports the engagement element 27c elastically with respect to a base element 46c in the actuating direction 12c. The base element 46c can be, for example, a claw piston. In addition, the damping unit 44c has a multiplicity of springs 45c uniformly distributed along a circumference of the second clutch half 11c. In doing so, the springs 45c damp the axial movement of the engagement element 27c. The springs 45c are in each case arranged so that they act between an engagement element 27c and the base element 46c. A spring 45c is in each case connected by one end to an engagement element 27c and by another end to the base element 46c. The engagement elements 27c are therefore arranged with respect to the main body 26c in an axially resilient manner. The damping unit 44c automatically sets up and maintains a defined axial starting position of the engagement element 27c relative to the main body 26c. The springs 45c are in each case in the form of a helical spring. A particularly advantageous embodiment, in which every second engagement element is connected to one another and neighboring engagement elements can give independently of one another, is shown in FIG. 12.

FIG. 13 shows, schematically, a further alternatively designed interlocking gearshift unit in an open state (FIG. 13a) and a closed state (FIG. 13b).

Here, the damping unit 24d locates the rotatable engagement element 14d relative to the rigid engagement element 13d in only one of the two circumferential directions 15d, as a result of which the springs 25d only damp the rotation of the rotatable engagement element 14d in one of the two circumferential directions 15d. Here, the second circumferential direction is blocked by a mechanical stop. Such an embodiment is distinguished by particular simplicity. Especially with this embodiment of single-sided damping, it has been shown to be advantageous when the engagement elements 27d as well as the fang teeth 20d, 21d and also the blocking teeth 18d, 19d each have chamfered face surfaces. Here, with regard to a compression direction 49d of the damping unit 24d, that is to say in a direction in which, in the exemplary embodiment, the spring 25d is compressed, the engagement elements 27d are chamfered in a rising direction, the fang teeth 20d, 21d are chamfered in a falling direction, and the blocking teeth 18d, 19d are likewise chamfered in a falling direction. Here, the number of engagement elements 27d is twice the number of fang teeth 20d, 21d, thus enabling the backlash play in the meshed state to be reduced to a minimum. As well as the particular simplicity, this embodiment is distinguished in that blocking during meshing due to a tooth-on-tooth position is effectively prevented. In contrast with the other exemplary embodiments, in the exemplary embodiment of FIG. 13, a further advantageous detail, which can also be used in combination with other exemplary embodiments, is included; the fang teeth are supported by means of a stop and not by a blocking tooth. In each case, a tooth of the second clutch half engages in the tooth gap between a blocking and a fang tooth on the first clutch half.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An interlocking gearshift unit for a motor vehicle drive train, the interlocking gearshift unit comprising:
   a first clutch half; and
   a second clutch half, wherein the first and second clutch halves are arranged so that they can slide relative to one another along an actuating direction to produce a connection with a fixed rotational relationship,
   wherein at least the first clutch half has a first engagement element and a second engagement element which can move with respect to the first engagement element,
   wherein the first and second engagement elements are arranged so that they can move with respect to one another in a circumferential direction,
   wherein the first engagement element has a plurality of blocking teeth and the second engagement element has a plurality of fang teeth,
   wherein the plurality of fang teeth are arranged on a face side of the second engagement element and extend axially along an actuating direction relative to the face side,
   wherein a fang tooth of the plurality of fang teeth engages between two blocking teeth of the plurality of blocking teeth separated by a circumferential distance such that the fang tooth is moveable in a circumferential direction between the two blocking teeth and the two blocking teeth form an interlocking stop for the fang tooth, and
   wherein, in a meshing operation, one of the plurality of fang teeth contacts one of a plurality of third engagement elements of the second clutch half before the one of the plurality of third engagement elements of the second clutch half comes into contact with the blocking teeth.

2. The interlocking gearshift unit of claim 1, wherein the plurality of blocking teeth have a circumferential extension that is greater than a circumferential extension of the plurality of fang teeth.

3. The interlocking gearshift unit of claim 1, wherein the first clutch half has a damping unit which locates the second engagement element so that it can move elastically relative to the first engagement element in the circumferential direction.

4. The interlocking gearshift unit of claim 1, wherein the first and second engagement elements are also arranged so that they can slide elastically relative to one another along the actuating direction.

5. The interlocking gearshift unit of claim 1, wherein the second clutch half has a main body configured to transmit torque, wherein the plurality of third engagement elements are arranged so that they can slide elastically with respect to the main body along the actuating direction.

6. The interlocking gearshift unit of claim 3, wherein the damping unit elastically locates the second engagement element relative to the first engagement element in only one of the two circumferential directions and the plurality of third engagement elements, the plurality of fang teeth, and the plurality of blocking teeth each have chamfered face surfaces, wherein, with regard to a compression direction of the damping unit, the plurality of third engagement elements of the second clutch half are chamfered in a rising direction, the plurality of fang teeth are chamfered in a falling direction, and the plurality of blocking teeth are chamfered in a falling direction.

7. The interlocking gearshift unit of claim 1, a number of the plurality of third engagement elements of the second clutch half is twice a number of the plurality of fang teeth.

8. The interlocking gearshift unit of claim 1, wherein the plurality of blocking teeth are arranged on an inner circumference of the first engagement element.

* * * * *